United States Patent
Pappas et al.

(10) Patent No.: US 11,800,012 B2
(45) Date of Patent: Oct. 24, 2023

(54) METHOD AND APPARATUS FOR PROVIDING INFORMATION ON AN EMERGENCY CALL

(71) Applicant: MOTOROLA SOLUTIONS, INC., Chicago, IL (US)

(72) Inventors: Scott J Pappas, Lake Zurich, IL (US); Richard English, Orangevale, CA (US); Tetiana Begma, Cracow (PL); Dominik Wojtaszek, Debica (PL); Anna Walo-Nowakowska, Cracow (PL); Leslaw Wasowicz, Cracow (PL); Kamil Kowalski, Cracow (PL); Dawid Duleba, Cracow (PL); Samuel Bard, Kempner, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/654,679

(22) Filed: Mar. 14, 2022

(65) Prior Publication Data
US 2023/0291834 A1    Sep. 14, 2023

(51) Int. Cl.
*H04M 3/51*    (2006.01)

(52) U.S. Cl.
CPC ....... *H04M 3/5116* (2013.01); *H04M 3/5133* (2013.01); *H04M 3/5175* (2013.01)

(58) Field of Classification Search
CPC ......... H04W 4/90; H04W 76/50; H04W 4/02; H04W 4/029; H04M 3/5116; H04M 2242/04; H04M 11/04; H04M 1/72424; H04M 3/42348; G08B 25/016; G08B 25/001; G08B 25/006; G08B 27/001
USPC ...................................... 455/404.1
See application file for complete search history.

(56) References Cited

U.S. PATENT DOCUMENTS

| | | | |
|---|---|---|---|
| 5,249,223 A | 9/1993 | Vanacore | |
| 8,098,798 B2 | 1/2012 | Goldman et al. | |
| 8,995,948 B2 | 3/2015 | Walker et al. | |
| 2010/0166154 A1 | 7/2010 | Peters | |
| 2012/0196558 A1 | 8/2012 | Reich et al. | |
| 2016/0316493 A1* | 10/2016 | Davis | H04W 4/14 |
| 2016/0321574 A1* | 11/2016 | Peterson | G06Q 10/063 |
| 2022/0141637 A1* | 5/2022 | Pellegrini | H04M 1/72469 455/404.1 |

OTHER PUBLICATIONS

The International Search Report and the Written Opinion, corresponding patent application No. PCT/US2023/012908 filed: Feb. 13, 2023, dated May 16, 2023, all pages.

* cited by examiner

*Primary Examiner* — Maria El-Zoobi

(57) ABSTRACT

A method and apparatus for displaying information regarding calls to a plurality of PSAPs is provided herein. During operation, an interface will display information as to whether a PSAP is receiving calls it normally would not be receiving, information as to whether or not a PSAP is not working correctly, and information on a status of any re-routed calls to a PSAP. In an alternate embodiment of the present invention, a reason for a PSAP call re-route is also provided.

14 Claims, 4 Drawing Sheets

METHOD AND APPARATUS FOR PROVIDING INFORMATION ON AN EMERGENCY CALL

BACKGROUND OF THE INVENTION

Oftentimes calls to an emergency call center, such as a public-safety access point (PSAP) need to be re-routed to another PSAP. Public-safety dispatchers (which may be dispatchers operating a PSAP) may be unaware of the re-routed call, unaware of the reason for the re-route, and/or unaware of the status of the re-route (i.e., call successfully rerouted or not). This often results in the public safety dispatcher receiving incomplete information about the call for service, which may prevent dispatching the correct resources to handle the call. In the above situation, it would be beneficial if the dispatch operator (and others) may receive information about any re-routed call to a PSAP, in an easily-understandable format.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for displaying information regarding calls to a plurality of PSAPs is provided herein. During operation, an interface will display information as to whether a PSAP is receiving calls it normally would not be receiving, information as to whether or not a PSAP is not working correctly, and information on a status of any re-routed calls to a PSAP. In an alternate embodiment of the present invention, a reason for a PSAP call re-route in tabular fashion is also provided.

As one of ordinary skill in the art will recognize, a PSAP is preferably accessed by a user by dialing an emergency number. It should be noted that the term "emergency number" refers to the enhanced 911, E-911, or E911. E911 is a system used in North America to automatically provide the caller's location and telephone number to 911 dispatchers at a PSAP. However, in other jurisdictions, the term "emergency number" encompasses any universal emergency telephone number in the region (e.g., European Union, 112) utilized for non-anonymous reporting of public-safety incidents.

The calling of the emergency number results in the caller being directed to a live operator (dispatcher) at a PSAP, and information being provided to the operator about the caller (e.g., name, number, and location). Thus, regardless of the actual telephone number utilized, a call to an emergency number is routed to a PSAP, which is a call center operated by the local government. At the PSAP, the emergency call is answered by a specially trained official known as an emergency dispatcher or PSAP operator. The operator's computer receives information from the telephone company about the physical address (for landlines) or geographic coordinates (for wireless) of the caller. The dispatch operator is trained to collect pertinent information about the incident from the caller. This information is used to dispatch police, fire, medical, and other services as needed.

Figure 1:
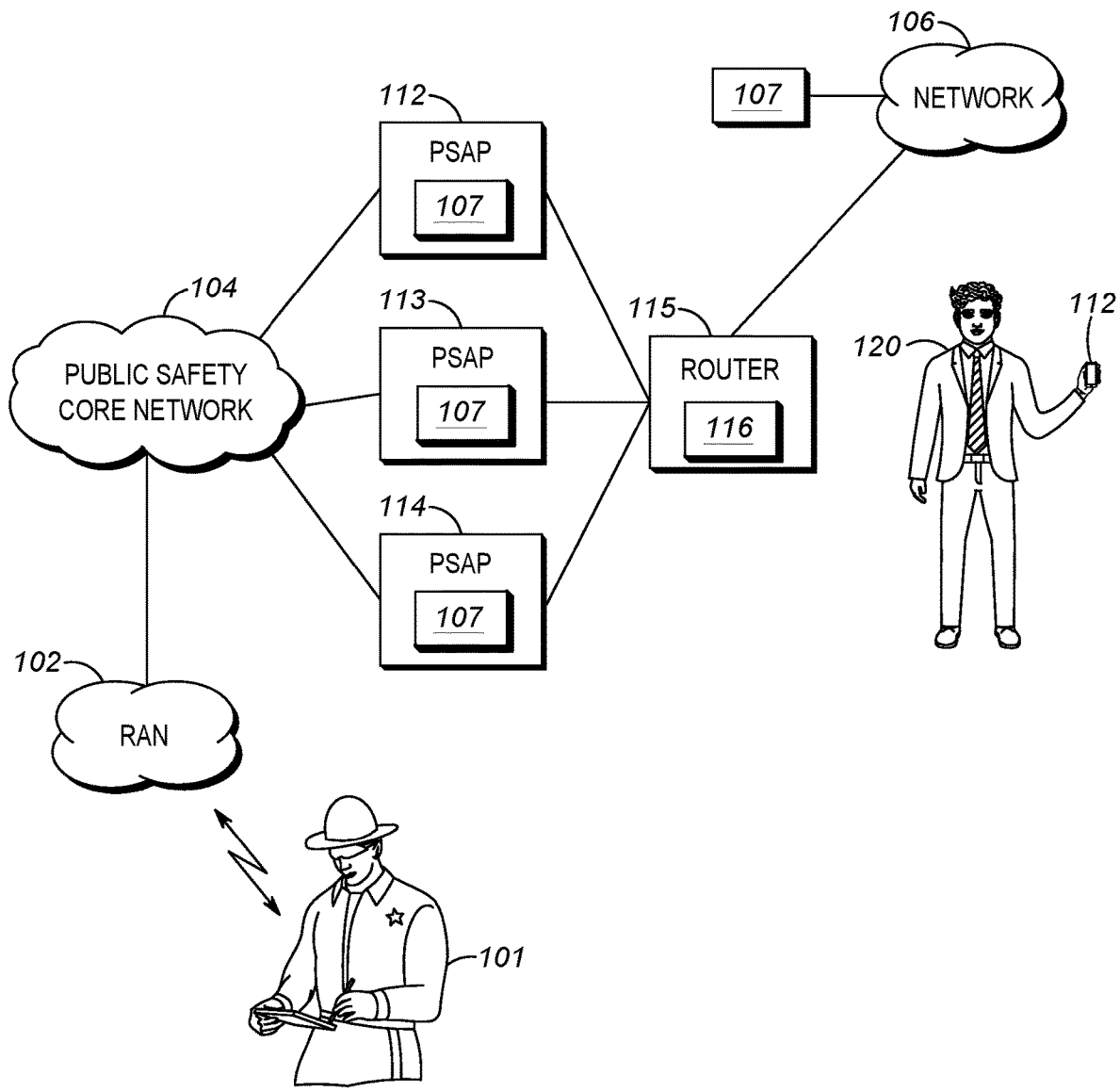
FIG. 1 shows a general operating environment for the present invention.

FIG. 1 illustrates a system for implementing the present invention showing several PSAPS 112-114. System 100 includes one or more radio access networks (RANs) 102, a public-safety core network 104, device 112, public network 106, interfaces 107, and emergency dispatch centers 112-114 serving as a PSAPs 112-114, router 115, officer 101, and user 120.

As shown in FIG. 1, several separate networks exist, namely public-safety core network 104, and public network 106 (e.g., Verizon, Spring, AT&T, . . . , etc.). Public network 106 may be wired or wireless, and comprises a standard network configured to facilitate standard data transmission and calls between any device 112 and PSAPs 112-114.

Each RAN 102 includes typical RAN elements such as base stations, base station controllers (BSCs), routers, switches, and the like, arranged, connected, and programmed to provide wireless service to user equipment (e.g., radio operated by officer 101) in a manner known to those of skill in the relevant art.

In a similar manner, public network 106 includes elements (which may be shared) such as base stations, base station controllers (BSCs), routers, switches, and the like, arranged, connected, and programmed to provide data service to user equipment 112 (e.g., smart phone or computer 112 operated by user 120) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications to/from officer 101.

Device 112 may be any suitable computing and communication devices configured to engage in wired or wireless communication over public network 106. Such communication may comprise standard cellular data. For example, device 112 may comprise a mobile device running an Android™ or iOS™ operating system capable of placing calls to PSAPs 112-114 and receiving standard text messages from PSAPs 112-114.

PSAPs 112-114 are preferably manned by an operator (also referred to as a dispatcher) and configured to receive emergency calls from device 112, information about the call may be provided/forwarded to officer 101 (via core network 104 and RAN 102).

PSAPs 112-114 comprises interface 107 that provides the dispatch operator necessary information about the call. Although interface 107 is shown existing within PSAPs 112-114, in alternate embodiments, interface 107 may be located outside of PSAPs 112-114 and used to provide information about emergency calls to . When located outside of PSAPs 112-114, interface 107 is connected to router 115 through an intervening network (e.g., networks 104 or 106).

Router 115 is provided to receive calls to various PSAPs and route them accordingly. The routing of calls to various PSAPs typically occurs based on a location of caller 120, so that typically the call is routed to a "primary" PSAP within a proper jurisdiction. However, there may be instances where the primary PSAP is offline, or otherwise unavailable. In this situation, a decision will be made by router 115 to route the call from user 120 to a "secondary" available PSAP (i.e., typically, a working PSAP that is closest geographically to caller 120).

Information about the call, PSAPS, and routes is maintained within database 116, which comprises standard memory (e.g., ROM). Such information includes, but is not limited to the callers telephone number, geographic locations for all PSAPs, a primary (first) PSAP identity where the call was attempted to be routed, a secondary (second) PSAP identity where the call was routed if the first PSAP was offline or otherwise unavailable, a third PSAP identity where the call was routed if the first and the second PSAP were offline or otherwise unavailable, . . . , etc. This is illustrated in Table 1.

TABLE 1

PSAP statuses.

| Caller ID | PSAP/status | PSAP/status | PSAP/status | ... etc |
|---|---|---|---|---|
| 232-325-2233 | PSAP 1024 Successful | | | |
| 545-298-0989 | PSAP 421 Offline | PSAP 534 Successful | | |
| 755-981-0232 | PSAP 234 Successful | | | |
| 755-983-9767 | PSAP 234 Overloaded | PSAP 534 Overloaded | PSAP 2340 Successful | |

The information in Table 1 (or a portion of the information) is displayed on interface 107. In one embodiment, only PSAPs that have been unsuccessfully routed to are displayed along with PSAPS where calls have been rerouted to. An example of this is shown in FIG. 2.

Figure 2:
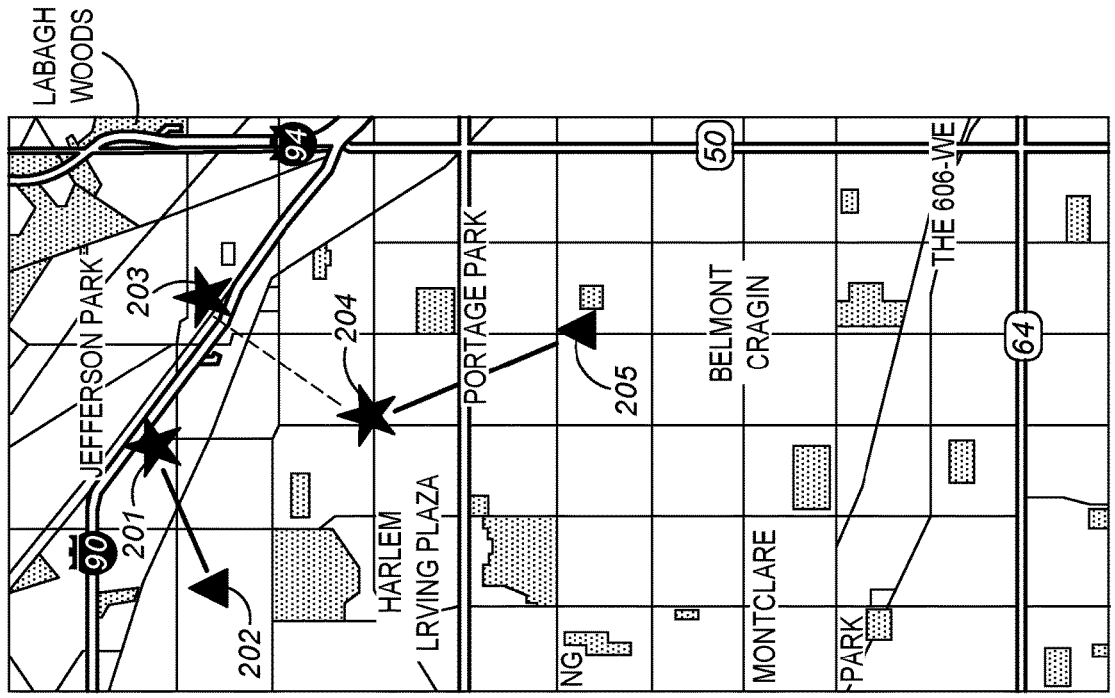
FIG. 2 illustrates information displayed on the interface of FIG. 2.
Figure 2:

As is evident, in FIG. 2, interface 107 presents a first icon (or fist color PSAP) that is utilized to illustrate PSAPs that are unavailable, and a second icon (or second color PSAP) that is utilized to illustrate a PSAP that is available. Additionally, a first formatted line is presented to illustrate a successful re-route of a call, and a second formatted line is utilized to illustrate an unsuccessful re-rout of a call.

With the above in mind, FIG. 2 shows interface 107 presenting information that PSAP 201 is unavailable and a call to PSAP 201 has been successfully re-routed to PSAP 202, as indicated by the solid line between PSAP 201 and PSAP 202. Also shown in FIG. 2 interface 107 is presenting that PSAP 203 is unavailable, and a call to PSAP 203 was unsuccessfully re-routed to PSAP 204, and ultimately successfully rerouted to PSAP 205.

It should be noted that a further icon (or color of a PSAP) may be utilized to further distinguish a reason for a PSAP being unavailable. Thus, although not shown in FIG. 2, a first icon (or similar icon with first PSAP color) may be used to designate PSAPs that are overloaded, while a second icon (or similar icon with a second PSAP color) may be used to designate PSAPs that are offline.

It should also be noted that all PSAPs and connecting lines in FIG. 2 may be displayed over a map, with the PSAPs being located at their approximate real-life geographic locations.

In an alternate embodiment, interface 107 is configured to present a textual (tabular) representation of the PSAPs 206 comprising a name of the first PSAP, the status of the first PSAP, a name of the second PSAP, and the status of the second PSAP. A time is also presented that includes a time in which the call was routed to each PSAP.

Figure 3:
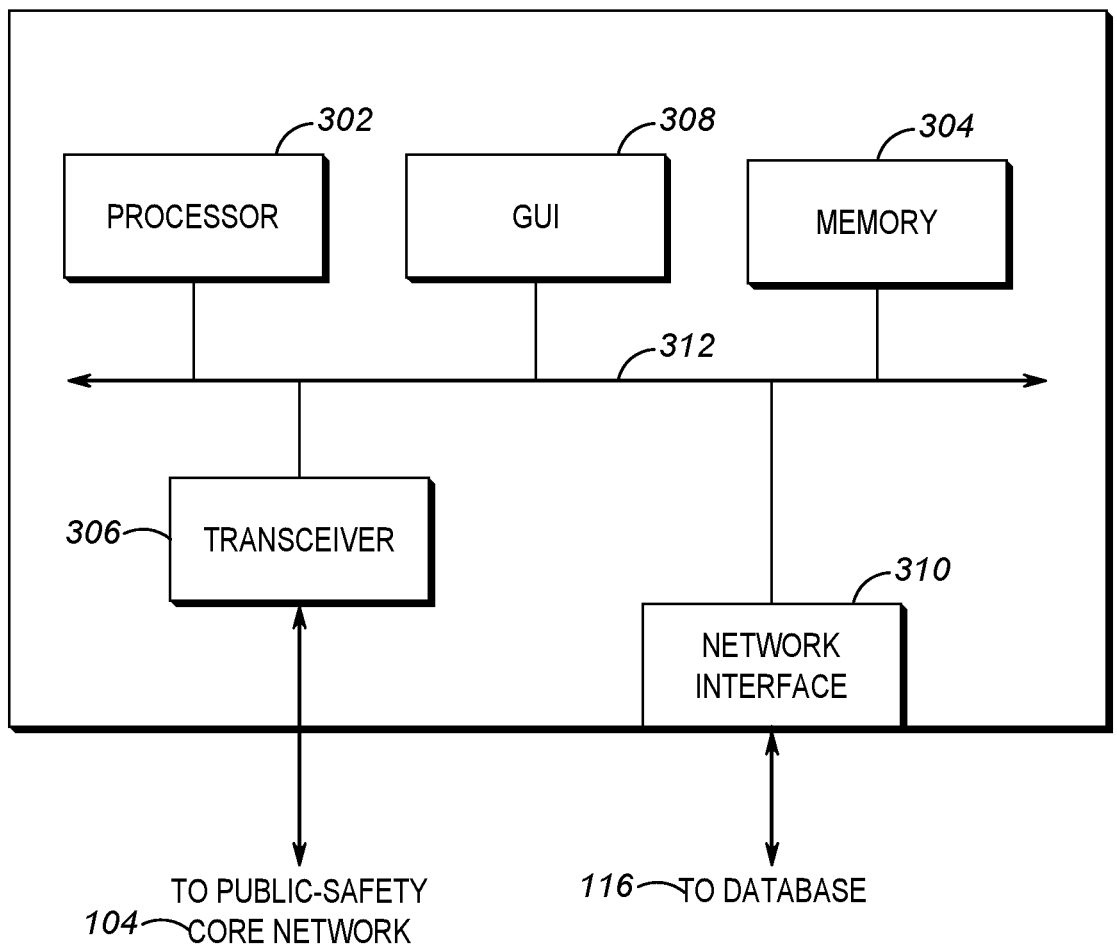
FIG. 3 is a block diagram of an interface configured to display information about a re-routed call to a PSAP.

FIG. 3 is a block diagram of interface 107. Interface 107 is capable of executing instructions (sequential or otherwise) that specify actions to be taken by the server. Interface 107 may include various components connected by bus 312. Interface 107 may include hardware processor (logic circuitry) 302 such as one or more central processing units (CPUs) or other processing circuitry able to provide any of the functionality described herein when running instructions. Processor 302 may be connected to memory 304 that may include a non-transitory machine-readable medium on which is stored one or more sets of instructions. Memory 304 may include one or more of static or dynamic storage, or removable or non-removable storage, for example. A machine-readable medium may include any medium that is capable of storing, encoding, or carrying instructions for execution by processor 302, such as solid-state memories, magnetic media, and optical media. Machine-readable medium may include, for example, Electrically Programmable Read-Only Memory (EPROM), Random Access Memory (RAM), or flash memory.

The instructions may enable interface 107 to operate in any manner thus programmed, such as the functionality described specifically herein (displaying PSAP status, etc.), when processor 302 executes the instructions. The machine-readable medium may be stored as a single medium or in multiple media, in a centralized or distributed manner. In some embodiments, instructions may further be transmitted or received over a communications network via a network interface 310 utilizing any one of a number of transfer protocols (e.g., MPLS, internet protocol (IP), transmission control protocol (TCP), user datagram protocol (UDP), hypertext transfer protocol (HTTP), etc.).

Network interface 310 may thus enable interface 107 to communicate with router 115, to access database 116 to access the information shown in Table 1. Network interface 310 may include electronic components such as a transceiver that enables IP, serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which camera may be connected via network interface 310 may include a local area network (LAN), a wide area network (WAN), a packet data network (e.g., the Internet), mobile telephone networks (e.g., cellular networks), and wireless data networks.

GUI 308 provides a mechanism for displaying information. For example, GUI 308 may provide a way for a user view information as shown in FIG. 2. In order to provide the above features (and additional features), GUI 308 may comprise any combination of a touch screen, a computer screen, or any other interface needed to display information to the user.

Transceiver 306 comprises well known long-range transceivers that utilize any number of network system protocols. (As one of ordinary skill in the art will recognize, a transceiver comprises both a transmitter and a receiver for transmitting and receiving voice and data). For example, transceiver 306 may be configured to utilize IP, Internet or a next-generation cellular communications protocol operated by a cellular service provider, or any public-safety protocol such as an APCO 25 network or the FirstNet broadband network. Transceiver 306 allows communications with public-safety officers 101.

As is evident, the interface 107 comprises network interface 310 configured to access database 116 and provide PSAP information to processor 302. Processor 302 is configured to determine that an attempt was made to route an emergency call to a second public-safety access point (PSAP) because a first PSAP is overloaded or unavailable. Processor 302 is configured to cause GUI 308 to present a first icon representing the first PSAP at a first location, wherein a format of the first icon indicates a current status of the first PSAP, a second icon representing the second PSAP at a second location, wherein a format of the second icon indicates a current status of the second PSAP, and a path between the first PSAP and the second PSAP, wherein a format of the path indicates a status of whether or not the emergency call was successfully routed to the second PSAP.

As shown in FIG. 2, the first icon, the second icon, and the path can be presented over a map, wherein the first icon and the second icon are located on the map at their real-life geographic locations. Additionally, the current status of PSAPs comprises whether or not the PSAP is overloaded, or whether or not the PSAP is unavailable or otherwise offline.

As shown in FIG. 1, the database may be located on a router that routes emergency calls to various PSAPs and the format of the path may comprise a dashed line, a solid line, a first color, or a second color.

Figure 4:
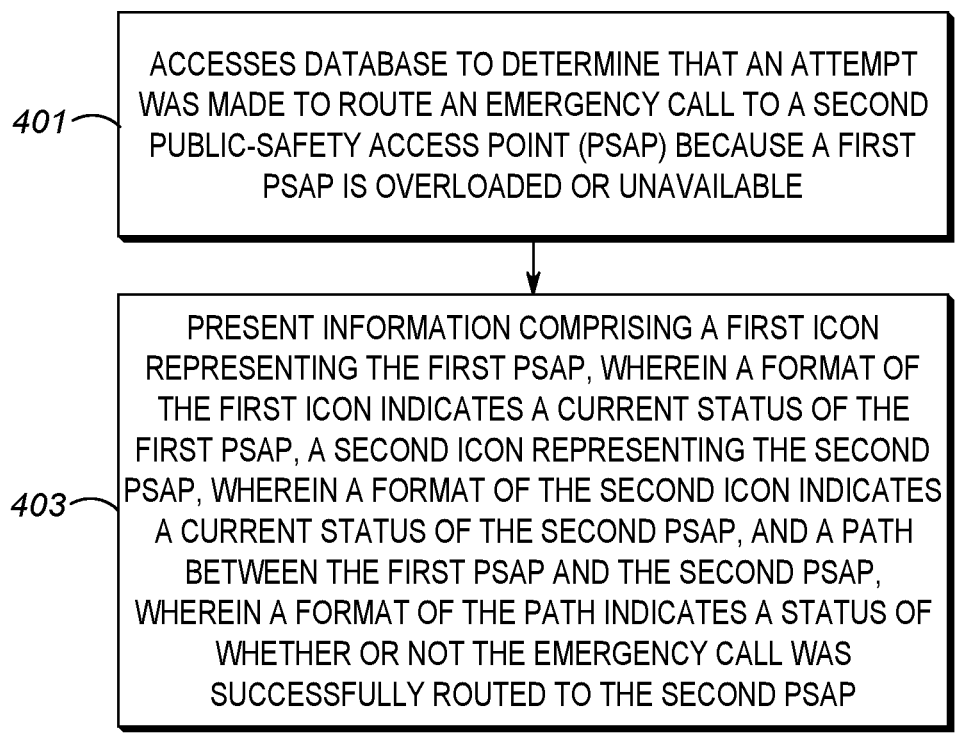
FIG. 4 is a flow chart showing operation of the interface of FIG. 2.

FIG. 4 is a flow chart showing operation of interface 107. The logic flow begins at step 401 where logic circuitry 302 utilizes interface 310 to accesses database 116 to determine that an attempt was made to route an emergency call to a second public-safety access point (PSAP) because a first PSAP is overloaded or unavailable. At step 403 logic circuitry 302 causes information to be presented on electronic display 308 (GUI 308). The information comprises a first icon representing the first PSAP, wherein a format of the first icon indicates a current status of the first PSAP, a second icon representing the second PSAP, wherein a format of the second icon indicates a current status of the second PSAP, and a path between the first PSAP and the second PSAP, wherein a format of the path indicates a status of whether or not the emergency call was successfully routed to the second PSAP.

As discussed above, in a further embodiment of the present invention, electronic display 308 may further display a name of the first PSAP, the status of the first PSAP, a name of the second PSAP, and the status of the second PSAP.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a Virtualized, Cloud, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    accessing a database to determine that an attempt was made to route an emergency call to a second public-safety access point (PSAP) because a first PSAP is overloaded or unavailable;
    presenting on an electronic display:
        a first icon representing the first PSAP, wherein a format of the first icon indicates a current status of the first PSAP,
        a second icon representing the second PSAP, wherein a format of the second icon indicates a current status of the second PSAP; and
        a path between the first PSAP and the second PSAP, wherein a format of the path indicates a status of whether or not the emergency call was successfully routed to the second PSAP;
    wherein the format of the path comprises a format comprising a dashed line, a solid line, a first color, or a second color.

2. The method of claim 1 wherein the first icon, the second icon, and the path are presented over a map, wherein the first icon and the second icon are located on the map at their geographic locations.

3. The method of claim 1, wherein the current status of the first PSAP comprises whether or not the first PSAP is overloaded, or whether or not the first PSAP is unavailable or otherwise offline.

4. The method of claim 1, wherein the current status of the second PSAP comprises whether or not the second PSAP is overloaded, or whether or not the second PSAP is unavailable or otherwise offline.

5. The method of claim 1 wherein the step of accessing the database comprises the step of accessing a database on a router that routes emergency calls to various PSAPs.

6. The method of claim 1 further comprising the step of:
    presenting on the electronic display, a tabular display comprising a name of the first PSAP, the status of the first PSAP, a name of the second PSAP, and the status of the second PSAP.

7. An apparatus comprising:
    a network interface configured to access a database to determine that an attempt was made to route an emergency call to a second public-safety access point (PSAP) because a first PSAP is overloaded or unavailable;
    a display configured to present:
        a first icon representing the first PSAP at a first location, wherein a format of the first icon indicates a current status of the first PSAP,
        a second icon representing the second PSAP at a second location, wherein a format of the second icon indicates a current status of the second PSAP; and
        a path between the first PSAP and the second PSAP, wherein a format of the path indicates a status of whether or not the emergency call was successfully routed to the second PSAP;
    wherein the format of the path comprises a format comprising a dashed line, a solid line, a first color, or a second color.

8. The apparatus of claim 7 wherein the first icon, the second icon, and the path are presented over a map, wherein the first icon and the second icon are located on the map at their geographic locations.

9. The apparatus of claim 7, wherein the current status of the first PSAP comprises whether or not the first PSAP is overloaded, or whether or not the first PSAP is unavailable or otherwise offline.

10. The apparatus of claim 7, wherein the current status of the second PSAP comprises whether or not the second PSAP is overloaded, or whether or not the second PSAP is unavailable or otherwise offline.

11. The apparatus of claim 7 wherein the database is located on a router that routes emergency calls to various PSAPs.

12. The apparatus of claim 7 wherein the display is further configured to present a tabular display comprising a name of the first PSAP, the status of the first PSAP, a name of the second PSAP, and the status of the second PSAP.

13. The apparatus of claim 7 wherein the format of the path comprises a format comprising a dashed line, a second format comprising a solid line, a first color, or a second color.

14. An apparatus comprising:
    a network interface configured to access a database to determine that an attempt was made to route an emergency call to a second public-safety access point (PSAP) because a first PSAP is overloaded or unavailable;

a display configured to present:
- a first icon representing the first PSAP at a first location, wherein a format of the first icon indicates a current status of the first PSAP,
- a second icon representing the second PSAP at a second location, wherein a format of the second icon indicates a current status of the second PSAP; and
- a path between the first PSAP and the second PSAP, wherein a format of the path indicates a status of whether or not the emergency call was successfully routed to the second PSAP;

wherein the first icon, the second icon, and the path are presented over a map, wherein the first icon and the second icon are located on the map at their geographic locations;

wherein the current status of the first PSAP comprises whether or not the first PSAP is overloaded, or whether or not the first PSAP is unavailable or otherwise offline;

wherein the current status of the second PSAP comprises whether or not the second PSAP is overloaded, or whether or not the second PSAP is unavailable or otherwise offline;

wherein the database is located on a router that routes emergency calls to various PSAPs;

wherein the display is further configured to present a tabular display comprising a name of the first PSAP, the status of the first PSAP, a name of the second PSAP, and the status of the second PSAP; and wherein the format of the path comprises a format comprising a dashed line, a second format comprising a solid line, a first color, or a second color.

\* \* \* \* \*